Dec. 18, 1962 R. N. SKALWOLD ETAL 3,068,581
CONTOUR SCANNING DEVICE
Filed Jan. 11, 1961 3 Sheets-Sheet 1

INVENTORS
ROBERT N. SKALWOLD
AND THOMAS G. BURKE
BY
ATTORNEYS

Dec. 18, 1962   R. N. SKALWOLD ETAL   3,068,581
CONTOUR SCANNING DEVICE
Filed Jan. 11, 1961   3 Sheets-Sheet 3

INVENTORS
ROBERT N. SKALWOLD
AND THOMAS G. BURKE
BY
ATTORNEYS 3,068,581
CONTOUR SCANNING DEVICE
Robert N. Skalwold and Thomas G. Burke, Rome, N.Y., assignors to the United States of America as represented by the Secretary of the Air Force
Filed Jan. 11, 1961, Ser. No. 82,140
7 Claims. (Cl. 33—174)
(Granted under Title 35, U.S. Code (1952), sec. 266)

The invention described herein may be manufactured and used by or for the United States Government for governmental purposes without payment to us of any royalty thereon.

The present invention forms a continuation-in-part of our application Serial No. 676,447, filed August 5, 1957, now abandoned, and relates generally to devices for use in measuring curved surfaces and more particularly to an improved instrument for locating and detecting inaccuracies or deviations in curved surfaces of reflector type antennas.

Reflector type antennas are in common use for short wave reception and transmission and in communications, radar and other locating or spotting systems. Any inaccuracy or deviation in the curved surface of the reflector type antenna results in scattering of the radio beam which is reflected by the irregular portion of the curved surface and, hence, causes deterioration in beam characteristics such as increased side lobes and radiated beam distortion, or a false indication of the direction of propagation or reception may result. It is desirable, therefore, to check the accuracy of the surface of a reflector type antenna before it is installed and at other times when it is suspected that there has been some deviation or inaccuracy in the surface. It is also necessary to measure the distortion of the surface in design and research for correlation with observed radiation patterns.

One object of the present invention is to provide a device which will directly and simply indicate to the operator the location and magnitude of the defect in the curved surface. To this end, one feature of this invention resides in a scanning device having a member rotatable about a fixed pivot for scanning a curved surface and means carried by the device and the member for indicating irregularities in a curved surface. The indicating means includes a wire and a scanning head which is passed over a curved surface and the change in length of path from the focus or center of the curved surface can be measured or indicated and recorded by measuring movement of one end of the wire while the other end remains fixed. The scanning head makes this possible due to the way in which it carries the wire over two grooved wheels to be geometrically equivalent to a point on the surface.

As illustrated, this scanning head is incorporated in a device provided with a substantially horizontal rotatable boom which is adjustable and which is provided with a rider which holds an essentially vertical sliding column, with the scanning head mounted at the bottom. Means is provided for indicating or detecting inaccuracies or deviations in the curved surface.

With the above and other objects in view, the invention will now be described with particular reference to the accompanying drawings which illustrate a preferred embodiment thereof, and in which.

Figure 1:
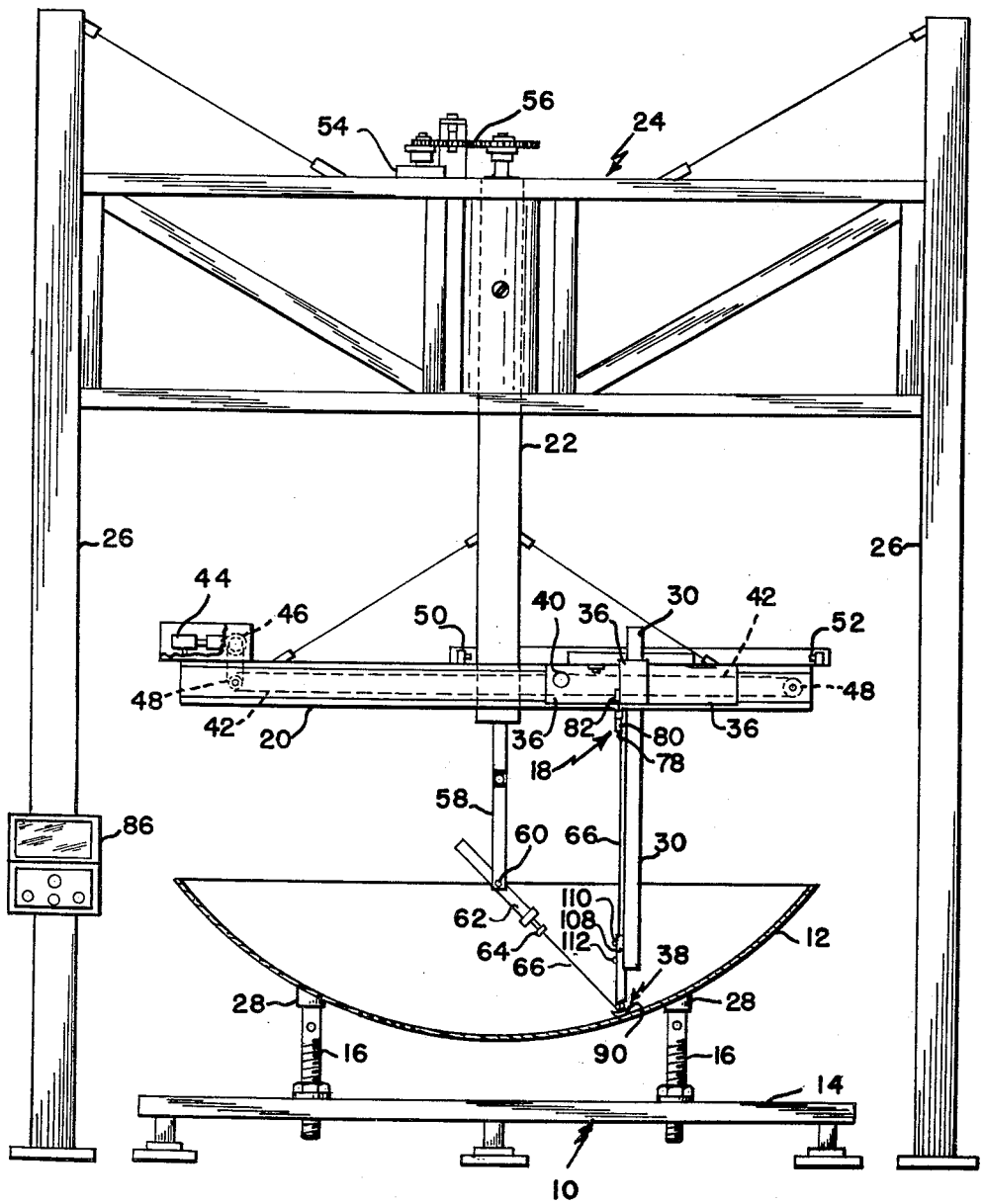
FIGURE 1 is a schematic view in side elevation of a preferred embodiment of the present invention.

The construction shown in FIGURE 1 is adapted for use both to indicate inaccuracies, deviations or irregularities in the curved surface as it is being scanned and also to record both the magnitude and the location of said inaccuracies, deviations or irregularities. The present device comprises a support 10 for an antenna 12 having a curved surface which is to be checked for deviations. The support 10 comprises a platform 14 having thereon a plurality of adjustable supporting members 16 which may be of any conventional type but which are illustrated herein as being in the form of screw jacks. The scanning mechanism 18 is supported on a substantially horizontal boom 20 which is fixed to and rotatable with a substantially vertical column 22. The column 22 is rotatably mounted in a supporting frame 24 mounted between vertical posts 26.

The vertical posts 26 may be in the form of channel beams into which the ends of the supporting frame 24 are positioned and in which the supporting frame 24 may be guided for vertical movement, if desired. Under ordinary circumstances, however, it is not necessary to vary the vertical position of the frame 24.

The support 10 may assume various forms and it is evident that suitable pads or properly shaped members 28 can be placed on the upper end portion of each of the adjustable supporting members 16. These pads 28 may engage only a limited area of the reflector 12 or, if the weight of the reflector 12 is great, the contacting surface of the members 28 may be sufficiently great to prevent deflection or distortion of said reflector.

Figure 2:
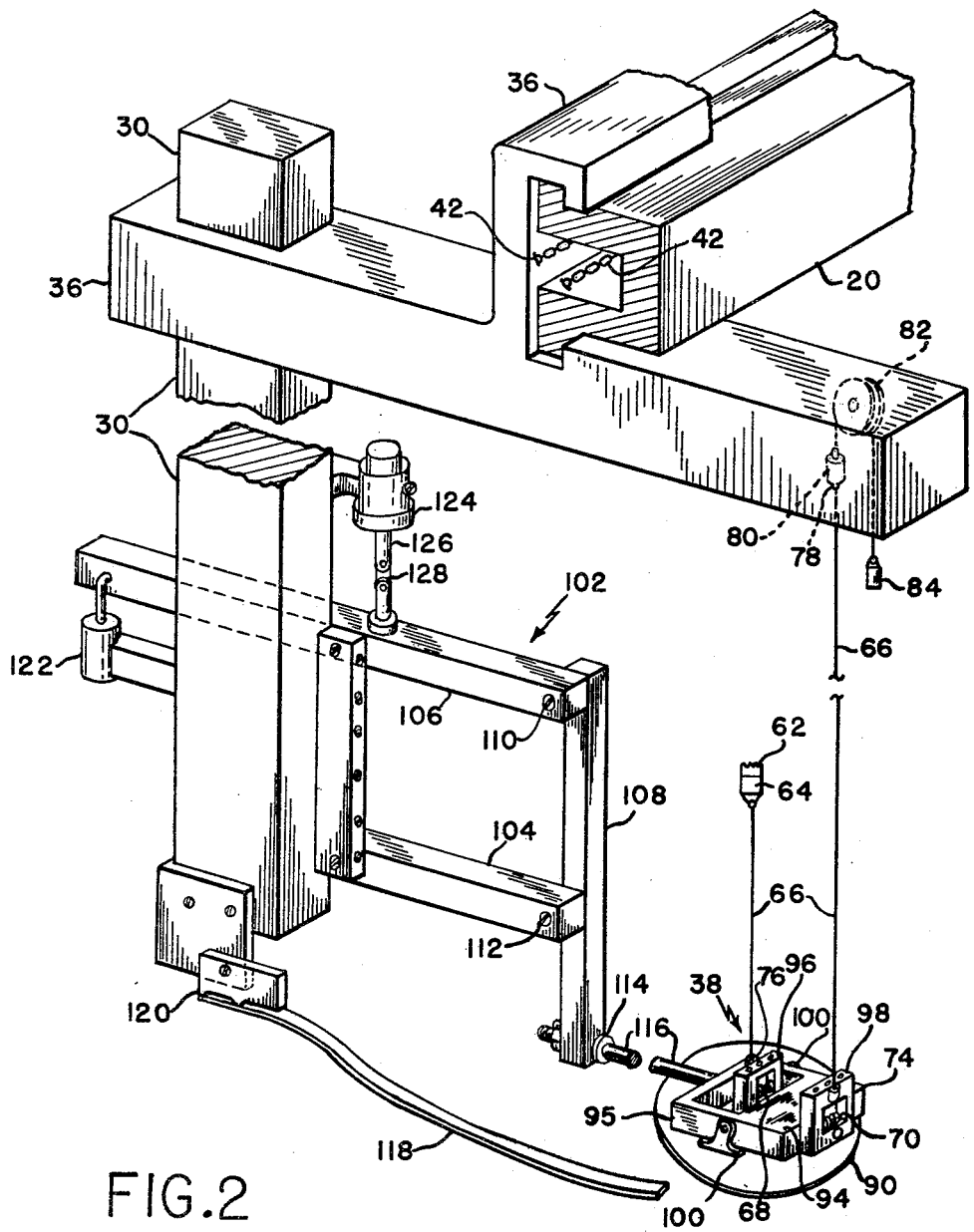
FIGURE 2 is an isometric view of a portion of the column on which the scanning "head" is carried.

The scanning mechanism 18 is moved in a predetermined manner by means of its column 30 which may be optionally provided with a stiffening structure to form a truss which prevents flexing or bending of the column 30 as it is moved outwardly. Referring to FIGURES 1 and 2, the vertical column 30 is slidably supported in a bracket on the horizontally movable member or rider 36 carried by the boom 20, and the column 30 is freely movable vertically in the rider 36 as the scanning operation progresses from the center of the antenna 12 toward the peripheral edge portion thereof or in a reverse direction of movement. If desired, the column 30 may be raised and lowered as necessary by power operated means or the column 30 may be counterbalanced so that even slight variations in pressure against a scanning head 38 secured to the bottom of column 30 may result in proper vertical adjustment of the column 30. The movement of the rider 36 along the boom 20 is related to the rotating movement of the boom 20 so that the rider 36 defines a spiral path as the scanning head 38 scans the surface of the antenna 12 for inaccuracies or deviations in its reflecting surface. Alternatively, the rider 36 may be made to define concentric circles. The movement of the rider 36 along the boom 20 may be controlled in any suitable manner. As illustrated in FIGURE 1, the rider 36 is clamped at 40 to a chain 42 which in turn is driven by a motor 44 through suitable speed reduction connections 46 and sprockets 48. As shown in FIGURE 1, the direction of movement of the rider 36 is controlled by limit switches 50, 52, which are engaged by the rider 36 as it approaches the limit of its movement in either direction. Limit switches 50, 52 may be arranged to cause either stoppage or reversal of motor 44 in a conventional manner.

The boom 20 and supporting column 30 are rotated by a motor 54 which is operatively connected to the supporting column 22 by suitable gear connections 56. The motors 44 and 54 may be interconnected and synchronized electrically so that movement of the rider 36 may be properly related to the rotation of the entire scanning device. By this means, the scanning of the reflector 12 will be along closely spaced spiral or concentric lines so that substantially every part of the reflector will be contacted by the scanning head 38.

The present apparatus is designed primarily to locate deviations or irregularities in a curved surface so that these irregularities can be corrected or correlated with antenna performance. It is evident, however, that the magnitude of the deviations or irregularities could be measured, if desired, by the use of suitable recording mechanism.

Under ordinary conditions of use, an antenna 12 having a curved surface is placed on the supports 28 with the center of rotation of the curved surface located coincident with the axis of the rotating column 22. Thus, when the column 22 is rotated, the scanning head 38 will describe a circular or spiral path on the curved surface and, if the surface along said paths is free from irregularities or defects, there will be no variation in the position of the scanning head 38 relatively to the rider 36 from the predetermined curvature.

The lower end portion of the column 22 is provided with a vertically adjustable reduced section 58 to the lower end of which is pivoted at 60 an arm 62 carrying at its lower end a wire or cable receiving chuck 64. The chuck has extending therefrom a very fine high strength wire. The wire 66 (FIGURE 2) shown in a position vertically along the axis of rotation of the antenna passes around grooved pulleys 68 and 70 located in elements 96 and 98, respectively. These elements are held in proper alignment by means of holes 74 and 76 which are precisely located to line up tangentially with the bottoms of the grooves in pulleys 68 and 70. The wire then connects to suitable motion sensing device such as the armature 78 of differential transformer 80. The differential transformer 80 is mounted suitably to rider 36 as illustrated in FIGURES 1 and 2. The fine wire is held under constant tension. One means of accomplishing this is to fasten a wire to the upper end of the armature 78, over a pulley 82, which is also to be mounted on rider 36, and attaching the end of the wire to weight 84. In this manner any change in length of the path from focus to scanning head to differential transformer is indicated by attaching the output of the differential transformer to a suitable recording device or indicating device 86 shown mounted on column 26 of FIGURE 1.

The scanning head 38 comprises a beveled or rounded sled or foot portion 90 of a size to avoid the dropping of the sled through any holes or perforations in the antenna and a pair of upstanding diametrically opposed ears 100 secured to the sled 90. A block 94 is pivotally mounted about an axis through said ears 100 and provides a support for the pulley containing elements 96 and 98. These elements are pivotally mounted for separate rotation about an axis orthogonal to that through ears 100.

The scanning head 38 is mounted on a parallel motion pantograph arrangement 102 fixed to the lower end of the column 30. The device 102 comprises a pair of arms or links 104 and 106 pivotally secured to a vertically extending link 108 at 110 and 112, respectively. The link 108 extends downwardly below the link 104 and at its lower end is provided with a bearing 114 to which an extension 116 of a yoke portion 95 of block 94 of scanning head 38 is secured.

The scanning head 38 is mounted to link 108 in such a way that the shaft or extension 116 can rotate on its axis which is the axis of pivotal elements 96 and 98. Since the scanning head sled 90 is connected with shaft 116 so that the sled is free to pivot about an axis through ears 100, the scanning head 38 is thus capable of tilting in two directions permitting shoe 90 to conform to the surface being scanned.

The lower end of the column 30 is provided, as shown in FIGURE 2, with a depending spring 118 which is arranged to actuate a switch 120 and suitable controls which, when spring 118 drops off the edge of the surface 12, prevents the column 30 from moving up or down and which actuates solenoid 122 to lower its end of link 106 of parallel motion arrangement 102, thus preventing the scanning head 38 or link 108 from striking the edge of the surface 12 as the boom 20 rotates to a position where the surface would again be contacted. When spring 118 again contacts the surface 12, switch 120 releases solenoid 122 permitting normal column controls to operate.

As the scanning head and shoe pass over the surface 12 and large deviations or normal changes in the contour cause extension link 108 to rise or fall, suitable controls will raise or lower column 30 in order to maintain link 106 essentially horizontal. One convenient device for accomplishing this is a differential transformer 124 which is secured to column 30 in any suitable manner. The transformer 124 is provided with a movable armature 126 connected to the upper link 106 through an articulated connection 128. During normal operation the movement of link 106 up or down will cause armature 126 to move in or out of differential transformer 124 which, through suitable nul-balance amplifiers and a motor, causes column 30 to rise or descend at a rate proportional to the displacement of armature 126 in transformer 124, thus maintaining link 106 in an essentially horizontal position and permitting the scanning head to follow curved surface with vertical motions of several feet.

Figure 3:
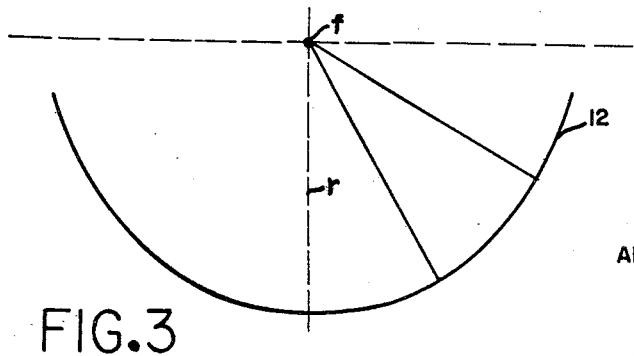

Referring now to FIGURES 3, 4, 5 and 6, it will be described how the device may be used to measure the contour of various types of curved surfaces by utilizing the geometric parameters thereof. The curved surface 12, shown schematically in FIGURE 3, represents a section of a spherical surface having a radius $r$. Thus, if the pivot 60 is located at the center or focus $f$ of the spherical surface 12, the distance from pivot 60 to the scanning head will not vary if the surface is free from defects. If, however, the surface 12 is imperfect, a variation in the measurement of $r$ is to be reflected. One way of accomplishing this is by attaching the differential transformer 80 to the end of 58 such that its movable element 78 is secured at 60 and connecting the wire 66 between the differential transformer element 78 and fixedly to the scanning head 38. The weight 84 would be affixed to the end of the armature remote from 60 to avoid having the armature drop out of the transformer. With the output of the differential transformer 80 connected to the recording device 86, any deviation can be recorded.

Figure 4:
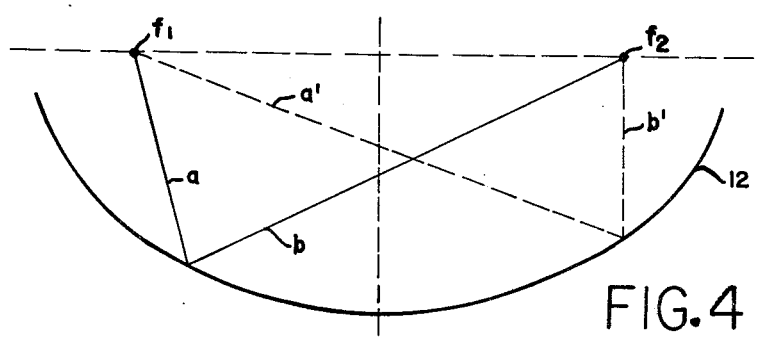

The curved surface 12 shown in FIGURE 4 is an ellipsoid. The geometric parameters of the curve may readily be determined by placing the pivot 60 at one focal point $f_1$ of the curve and by holding the wire 66 at the other focal point $f_2$ of the ellipse. One way of accomplishing this is to fasten the differential transformer 80 at $f_2$ and pivot 60 at $f_1$ and passing the wire 66 through the scanning head 38 as previously outlined. The scanning head will be connected to rider 36 and column 30 and accessories in the same manner as for all other surface measurements. Since $a+b=a'+b'$, a constant, no change or deviation will be shown on the recorder if the surface is correct. If, however, the surface is defective, variations in reading will occur.

Figure 5:
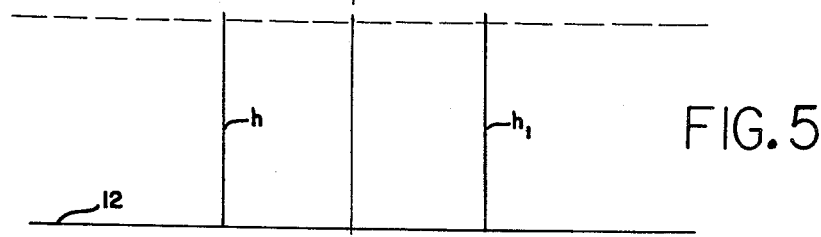

The surface 12 shown in FIGURE 5 is flat. This surface can be scanned while horizontal and the variations of the scanning head 38 can be recorded. One method of recording these variations is by attaching wire 66 fixedly to the scanning head 38 and thence to the differential transformer 80. The output of the differential transformer 80 is connected to drive the recording device 86.

Figure 6:
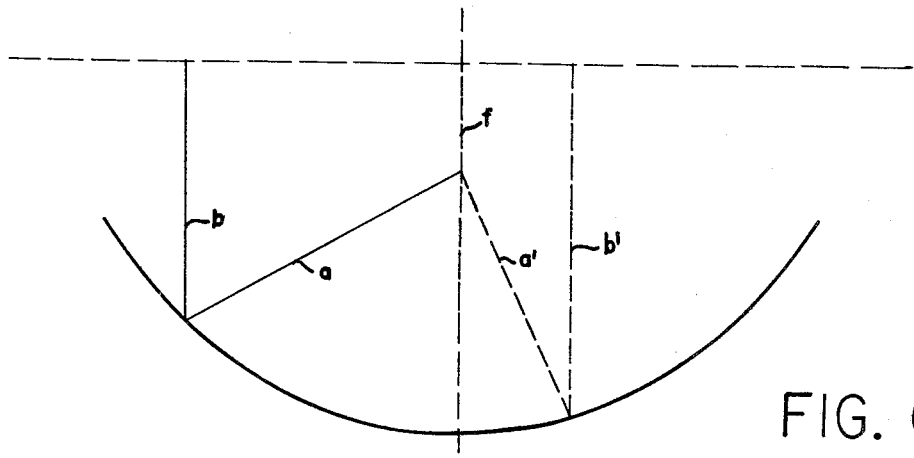
FIGURES 3, 4, 5 and 6 illustrate different contours on which the present device may be used.

The curved surface 12 shown in FIGURE 6 represents a section of a paraboloid. If the pivot 60 is located at the center or focus $f$ of the paraboloid, the distance $a+b$ will be constant as the device scans the surface, if the surface of the paraboloid is free from defects. If, however, the surface 12 has imperfections or defects therein, the deviation plus the exact azimuth and radial location of the deviations can be ascertained by readings plotted on the recording devices 86. One method of measuring this deviation is by attaching a very fine wire 66 to the chuck 68 and passing the wire through the scanning head 38 and thence attaching wire 66 to the armature of differential transformer 80 and the weight 84 as previously described relative to FIGURES 1 and 2. In scanning all surfaces of revolution the axis of revolution is made coincident with the axis of rotation of 22.

The present invention has been described with particular reference to one embodiment thereof wherein inaccuracies or imperfections are indicated by the use of differential transformers, but it is evident that inaccuracies could also be indicated by other means if so desired. The inaccuracies may also be indicated by the use of suitable mechanical devices having indicating means thereon and which are suitably connected with wire 66. Pulley 82 for example could be graduated or used to operate a potentiometer.

Since the basic device of this invention is capable of use with various geometric configurations, it should be noted that the adjustment of the basic device for various curvatures merely involves the changing or adding of brackets to and perhaps providing clearance slots for the wire in order to have the device conform to the parameters of the various shapes as, for example, are explained relative to FIGURES 3-6.

While the illustrated embodiment of the invention is designed to be particularly adapted for use in detecting irregularities and imperfections in a curved surface, the device may also be used to determine the contour of a curved surface by utilizing the geometric parameters of the contour. The device may be adjusted in accordance with the characteristics of the curved surface to determine whether or not the surface conforms to specified characteristics.

Although the invention has been described with particular reference to a preferred embodiment of the invention, it is to be understood that the invention is not to be limited thereto since the structure may be varied within the spirit and scope of the appended claims.

We claim:

1. A device for measuring the contours of a surface having a pattern by utilizing the parameters thereof comprising a first member; a scanning head mounted for movement in contact with said surface; a pulley member; cable means fixedly connected with said first member, extending to and through said scanning head, and connected to said pulley member for movement thereover; said members being located with respect to said surface such that the sum of the distances from each of said members to said surface represents a known quantity and straight lines drawn along the cable from each of said members to said scanning head and extending therebeyond intersect at a point on the surface to be scanned; means for taking up slack in said cable to accommodate changes in length between said members and said scanning head, and means for indicating a change in length of said cable between said members.

2. A device as defined in claim 1 wherein said surface is elliptical and one of said members is located at one focal point of said surface and the other of said members is arranged so that the cable between it and the scanning head passes through the second focal point.

3. A device as defined in claim 1 wherein said surface is parabolic and one of said members is located at the focal point of said surface while the other of said members is arranged such that the cable between it and the said scanning head forms a line parallel to the longitudinal axis of said surface.

4. A device as defined in claim 1 including means for driving said scanning head in rotation and translation.

5. A device as defined in claim 1 including means for driving said scanning head in rotation and translation and means for vertically positioning said scanning head.

6. A device as defined in claim 5 including a supporting means connected with said scanning head and said means for driving, said supporting means comprising a column, and linkage elements forming a parallel motion pantograph fixed to said column and said scanning head.

7. A device as defined in claim 6 including means for raising and lowering said column in response to the position of elements of said parallel motion pantograph.

References Cited in the file of this patent

UNITED STATES PATENTS

| 2,703,457 | Breisch | Mar. 8, 1955 |
| 2,841,009 | Mayes | July 1, 1958 |

FOREIGN PATENTS

| 12,922 | Great Britain | 1908 |
| 311,315 | Germany | Mar. 12, 1919 |